(12) United States Patent
Jaiswal et al.

(10) Patent No.: US 7,809,564 B2
(45) Date of Patent: Oct. 5, 2010

(54) VOICE BASED KEYWORD SEARCH ALGORITHM

(75) Inventors: Peeyush Jaiswal, Boca Raton, FL (US);
Naveen Narayan, Flower Mound, TX (US); Fang Wang, Plano, TX (US)

(73) Assignee: International Business Machines Corporation, Armonk, NY (US)

( * ) Notice: Subject to any disclaimer, the term of this patent is extended or adjusted under 35 U.S.C. 154(b) by 960 days.

(21) Appl. No.: 11/612,060

(22) Filed: Dec. 18, 2006

(65) Prior Publication Data

US 2008/0147399 A1    Jun. 19, 2008

(51) Int. Cl.
*G10L 15/04* (2006.01)
(52) U.S. Cl. ............... 704/251; 704/231; 704/270; 704/270.1
(58) Field of Classification Search ........... 704/251, 704/231, 270, 270.1
See application file for complete search history.

(56) References Cited

U.S. PATENT DOCUMENTS

| | | | |
|---|---|---|---|
| 4,928,302 A | 5/1990 | Kaneuchi et al. | |
| 6,397,179 B2 | 5/2002 | Crespo et al. | |
| 6,499,013 B1 | 12/2002 | Weber | |
| 6,571,210 B2 * | 5/2003 | Hon et al. | 704/251 |
| 6,862,713 B1 | 3/2005 | Kraft et al. | |
| 2003/0078781 A1 * | 4/2003 | Julia et al. | 704/270.1 |
| 2007/0043868 A1 * | 2/2007 | Kumar et al. | 709/226 |

OTHER PUBLICATIONS

Gu et al., "Spoken Query for Web Search and Navigation", pp. 1-5, retrieved Oct. 20, 2006 http://www10.org/cdrom/posters/p1010/index.htm.
Murray, "RPP#7 Spoken Word Search Engines and Educational Podcast Promos", retrieved Oct. 20, 2006 http:jdc.jefferson.edu/rpp/8/.

* cited by examiner

*Primary Examiner*—Qi Han
(74) *Attorney, Agent, or Firm*—Yee & Associates, P.C.; John R. Pivnichny

(57) ABSTRACT

A search algorithm utilizing confidence levels of keywords spoken by a caller to identify keyword indexed search items which best match the spoken keywords. In response to receiving a spoken search request from a caller, keywords are identified in the spoken search request. A list of candidates is created comprising a match to at least one of the keywords, wherein each candidate in the list is assigned a level of confidence in the match. Keyword indexed search items having at least one of the keywords as an index and an original matching score are then located. The original matching score of each keyword indexed search item is weighted with the level of confidence in the list of candidates to form weighted matching scores. The keyword indexed search items are sorted based on weighted matching score. A list of the sorted keyword indexed search items is then created.

19 Claims, 4 Drawing Sheets

VOICE BASED KEYWORD SEARCH ALGORITHM

BACKGROUND OF THE INVENTION

1. Field of the Invention

The present invention relates generally to an improved voice based keyword search system, and in particular to a search algorithm that uses confidence levels of keywords spoken by a caller to identify keyword indexed search items which best match the spoken keywords.

2. Description of the Related Art

A search engine is an information retrieval system designed to locate information stored on a computer system. When a user makes a request for information which meets certain criteria or keywords, the search engine searches and returns to the user a list of items that the search engine determines to be most relevant to the criteria or keywords entered by the user. This list is often sorted with respect to some measure of relevance of the results. Different search engines use different methods of determining the relevance of web sites, but most use some sort of quantitative method that determines the relevance of a site based on how many times the keywords appear in that particular site.

One way a user may enter keywords or criteria into a search engine is through the use of speech recognition devices. Speech recognition devices are generally known in the art of voice technologies. With speech recognition devices, a caller speaks into a microphone or telephone, and the speech recognition device receives the speech utterance and recognizes the words and phrases spoken by the caller. The speech recognition device may recognize the words or phrases spoken by the caller based on statistical features of the speech utterance as matching to known speech features of words in a vocabulary (e.g., represented in the grammar). A speech feature is normally represented as a feature vector which is a pure mathematical representation as mapped from the utterance waveform. Human speech is truly statistical in nature in that when a person says the same word several times, the waveform of the utterance will not be identical. However, the waveform should be similar, which results in speech feature vectors close to a vector representing the word in the speech feature vector. While a speech recognition device may identify the word or phrase which was most likely spoken by the caller, the statistical nature of speech recognition may also produce false results. This is due to the fact that the speech feature vectors are not identical every time, and thus there is a possibility the speech feature vector may be closer to another word feature vector, which is a cause for the misrecognition. In other words, the likely word or phrase identified by the speech recognition engine using statistics may not be the word or phrase actually spoken by the caller. For example, if a caller said the word "Boston", the speech recognition engine may recognize it as "Austin", since both words are acoustically close in speech features.

SUMMARY OF THE INVENTION

The illustrative embodiments provide a computer implemented method, data processing system, and computer program product for utilizing recognition confidence levels of keywords spoken by a caller to accommodate the statistical variations of human speech in identifying the keyword indexed search items which best match the spoken keywords in a statistical way. In response to receiving a spoken search request from a caller, keywords are identified in the spoken search request. A list of candidates is created comprising a match to at least one of the keywords, wherein each candidate in the list is assigned a level of confidence in the match. Keyword indexed search items having at least one of the keywords as an index and an original matching score are then located. The original matching score of each keyword indexed search item is weighted with the level of confidence in the list of candidates to form weighted matching scores. The keyword indexed search items are sorted based on weighted matching score. A list of the sorted keyword indexed search items is then created.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
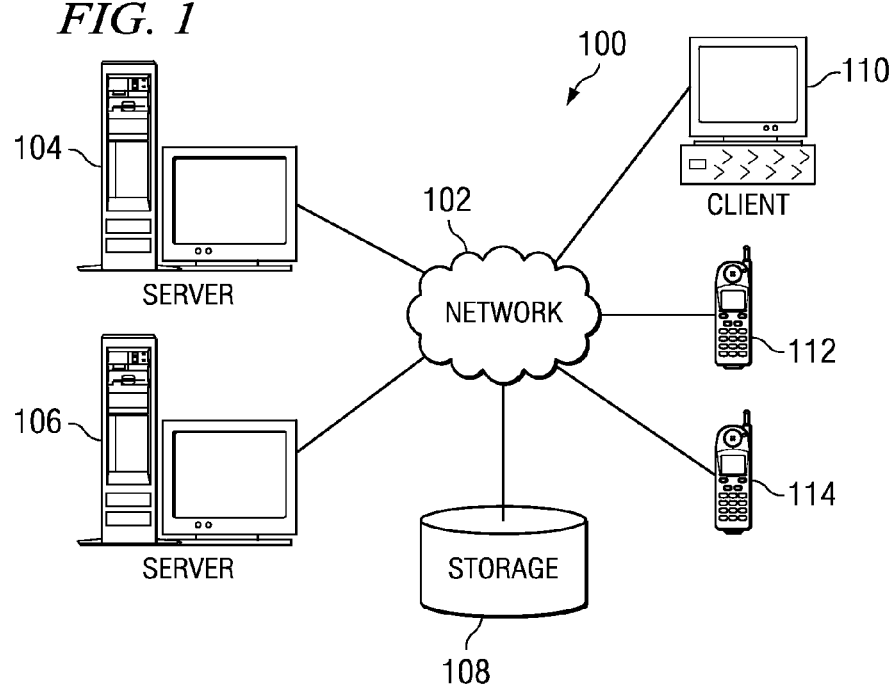
FIG. 1 depicts a pictorial representation of a distributed data processing system in which the illustrative embodiments may be implemented.
Figure 2:
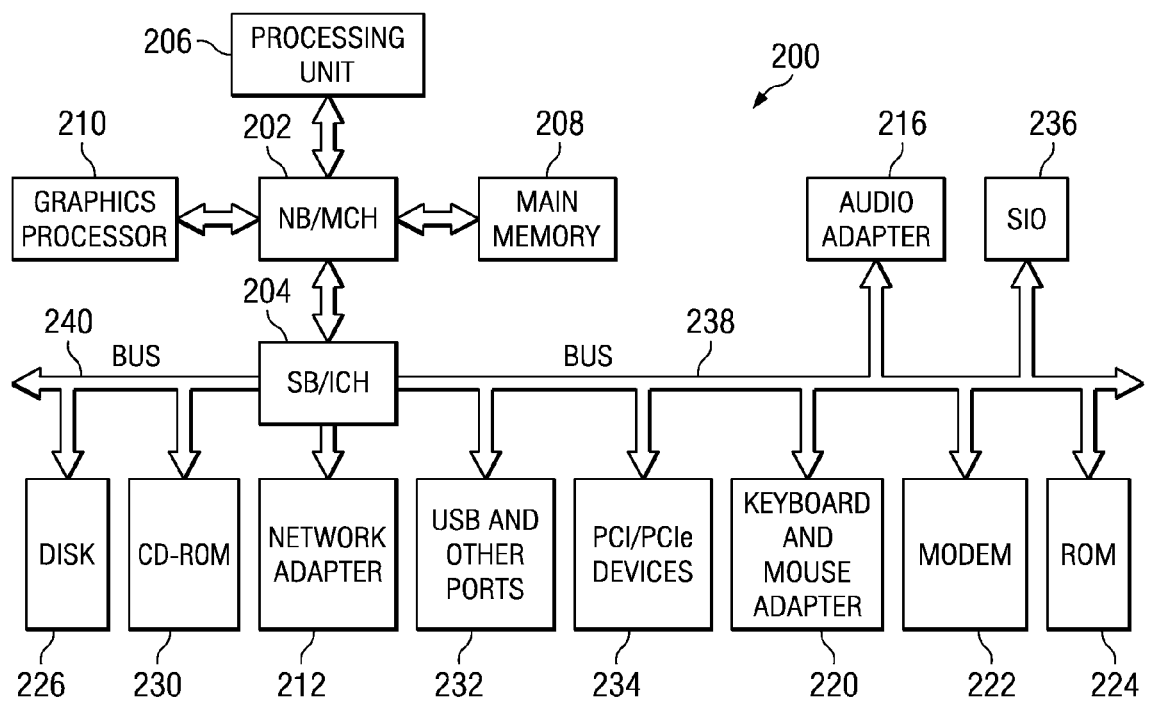
FIG. 2 is a block diagram of a data processing system in which the illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers, network computers, or telephone devices. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 or client 110 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200. Java and all Java-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The illustrative embodiments provide a search algorithm for voice based keyword searches. In particular, the search algorithm in the illustrative embodiments utilizes recognition confidence levels of keywords spoken by a caller to accommodate the statistical variations of human speech in identifying the keyword indexed search items which best match the spoken keywords in a statistical way. A speech recognition engine is provided which receives a spoken utterance from a caller. The speech recognition engine identifies keywords in the spoken utterance and creates a list of candidates comprising possible matches to the spoken keywords. It should be noted that the illustrative embodiments may employ any known speech recognition technique which allows for recognizing textual candidates to spoken keywords and confidence levels associated with the recognition process.

A search engine is also provided in the illustrative embodiments which receives the list of candidates and employs the search algorithm to match the candidates to keyword indexed search items in a database. The search algorithm employed by the search engine uses overall confidence levels assigned to each candidate by the speech recognition engine, as well as individual confidence levels assigned to each keyword in multiple keyword candidates, to weight existing matching scores obtained using traditional search algorithms, and thus determine which keyword indexed search items best match the keywords spoken by the caller. For example, if a caller says "Boston", the speech recognition engine may generate a candidate list with the word "Austin" having a confidence level of 0.9 and the word "Boston" with a confidence level of 0.8. With traditional search algorithms, the highest scored keyword is used to perform the search, which results in the search items being returned which all relate to "Austin", not "Boston". The search algorithm in the illustrative embodiments allows for using both words "Austin" and "Boston" in the search, thereby allowing "Boston" related search items to also be returned. By using the overall and individual confidence levels to weight the existing matching scores, the search algorithm in the illustrative embodiments provides an improved search accuracy for voice based keyword searches by accommodating the statistic nature of human speech to enhance the search accuracy.

Figure 3:
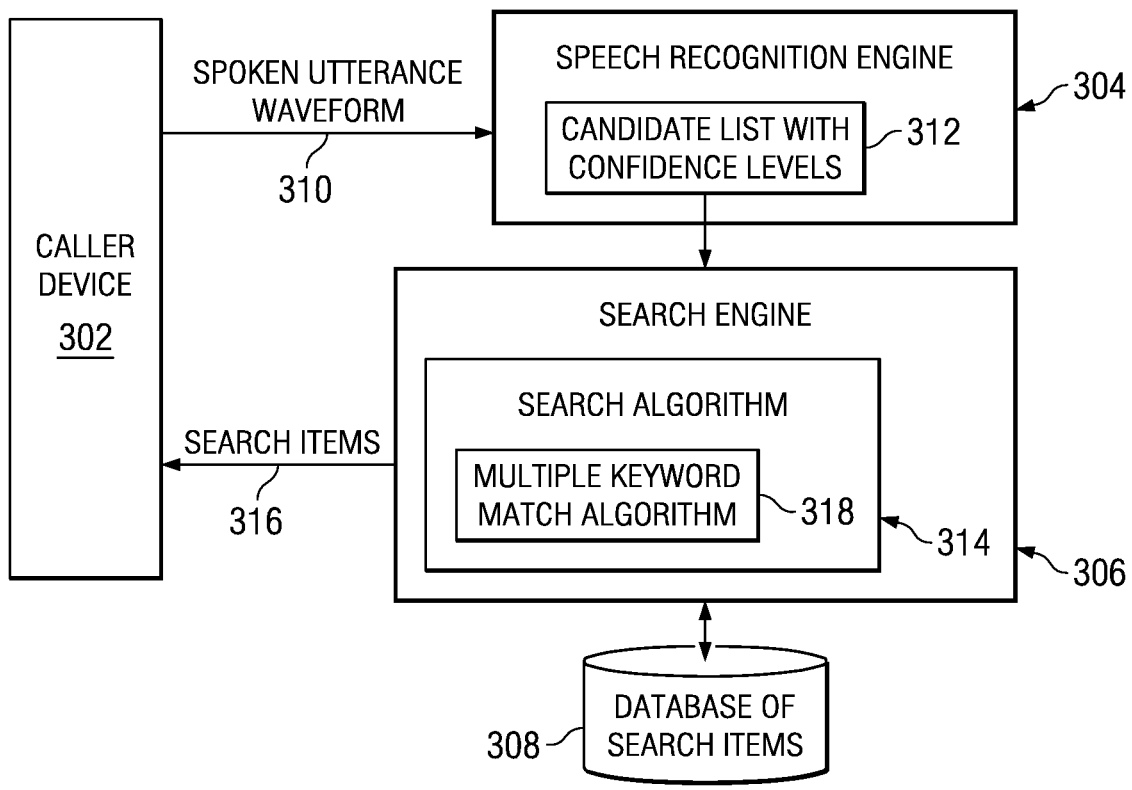
FIG. 3 is a block diagram of exemplary components with which the illustrative embodiments may be implemented.

FIG. 3 is a block diagram of exemplary components with which the illustrative embodiments may be implemented. Search system 300 may be implemented in network data processing system 100 in FIG. 1. In this illustrative example, search system 300 comprises caller device 302, speech recognition engine 304, search engine 306, and database 308.

Caller device 302 may be any type of mechanism capable of sending and receiving communication signals between speech recognition engine 304 and search engine 306, by way of a wired or wireless communication connection. Caller device 302 may be, for example, a conventional land-line telephone, a cellular telephone, an Internet based telephone device, a computer having a microphone or other audio input device, and the like. An example of caller device 302 may include client devices 110, 112, or 114 in FIG. 1.

Speech recognition engine 304 and search engine 306 may be implemented in a data processing system, such as data processing system 200 in FIG. 2, as well as within one or more servers, such as servers 104 and 106 in FIG. 1. In an alternative embodiment, speech recognition engine 304 or search engine 306 may be implemented in the same device as caller device 302.

Caller device 302 receives a spoken utterance from a user and transmits a spoken utterance waveform 310 to speech recognition engine 304. Upon receiving spoken utterance waveform 310, speech recognition engine 304 performs speech recognition on the utterance against a vocabulary of keywords. A keyword is defined in the search system as the key to the meaning of the search items. Speech recognition engine 304 uses all of the possible keywords defined in the search system as its vocabulary. If spoken utterance waveform 310 contains a keyword, speech recognition engine 304 then identifies candidates which may be a text match for the spoken keyword. Speech recognition engine 304 may identify candidates for the spoken keyword by analyzing speech utterance waveform 310 and extracting the feature vectors. The spoken feature vectors are then compared with the feature vectors saved in the vocabulary to identify possible candidates for the spoken keyword. For instance, if the caller says the word "Boston", speech recognition engine 304 creates candidate list 312 comprising possible text candidates matching the spoken keyword "Boston", which may include, for example, "Boston" and "Austin", among others. This entire identification process is a statistical process. Each spoken word should have only one corresponding feature vector in the feature vector space. If the spoken feature vector is closer to a particular vocabulary word feature vector, then that vocabulary word is more likely to be identified as a candidate.

In addition to creating candidate list 312, speech recognition engine 304 also assigns an overall confidence level to each identified candidate. A confidence level represents the probability measure that the candidate identified by speech recognition engine 304 matches the keywords spoken by the caller. In other words, the confidence level indicates how well each candidate matches the spoken keywords. If a candidate in candidate list 312 contains more than one keyword, speech recognition engine 304 may also assign a confidence level to each individual keyword in the candidate. Speech recognition engine 304 then provides candidate list 312 comprising one or more candidates which are matches to the keywords recognized within spoken utterance waveform 310 and their confidence levels to search engine 306.

Upon receiving candidate list 312 with the confidence levels from speech recognition engine 304, search engine 306 uses search algorithm 314 to identify those keyword indexed search items in database 308 which provide the closest match to the spoken keywords. If there is only one candidate in candidate list 312 and that candidate contains only one keyword, the search engine identifies the search items which have that keyword as the index in database 308. The search engine then returns the list of identified search items 316 to caller device 302.

If there is only one candidate in candidate list 312 but there are multiple keywords in the candidate, the search algorithm executes multiple keyword match algorithm 318. Multiple keyword match algorithm 318 obtains all of the search items from an index of database 308 which match at least one of the keywords in the candidate, and also obtains the original matching score for each search item. The original matching score is the matching score calculated using a traditional search algorithm and may be obtained from the keyword index. Multiple keyword match algorithm 318 then calculates a weighted matching score for each search item, wherein the weighted matching score comprises taking the original matching score from the traditional search algorithm and weighting the original matching score by the sum of all of the individual confidence levels of each of the keywords in the candidate appeared in the search item. For example, in the simplest form of a weighted operation, the existing matching score may be weighted by multiplying the existing matching score by the sum of the confidence levels. In this manner, if the confidence level is low (i.e., a not-so-confident match), the weighted matching score would be lowered to reflect the low confidence level. Multiple keyword match algorithm 318 then sorts the search items based on the weighted matching scores. In one embodiment, the search items are placed in order from highest matching score to lowest weighted matching score. Search engine 306 then returns the list of identified search items 316 to caller device 302, where the search items 316 are ordered from highest to lowest weighted matching score.

If there are multiple candidates in candidate list 312, speech recognition engine 304 sorts the candidates in candidate list 312 from highest confidence level to lowest confidence level prior to providing candidate list to search engine 306. When search engine 306 receives candidate list 312 comprising more than one candidate, if the overall confidence level of the first candidate in candidate list 312 is substantially higher than the second candidate in candidate list 312, search engine 306 processes the first candidate as if there is only one candidate in candidate list 312, as previously described. However, if the overall confidence level of the first candidate is not substantially higher than the second candidate, search engine 306 initializes an empty search item reservoir. The reservoir may be any place in which to hold search items while remaining candidates in the multiple candidate list are being processed. As the process continues along with the list of candidates, the identified search items are dropped into this reservoir for final processing at the end of candidate list 312. After initializing the reservoir, search engine 306 identifies the first few candidates in candidate list 312 whose overall confidence levels are significantly higher than the remaining candidates in candidate list 312. If a candidate contains only one keyword, search engine 306 creates a list of search items having the keyword as the index. Each of the search items has an original matching score which is weighted by the overall confidence level of the candidate (e.g., by multiplying the original matching score by the confidence level), and the list of search items is added to a reservoir. Search engine 306 processes the remaining first few candidates identified with high overall confidence levels in the same manner if the candidates have only one keyword.

If any of the remaining first few candidates identified with high overall confidence levels have multiple keywords, search engine 306 executes multiple keyword match algorithm 318. As previously mentioned, multiple keyword match algorithm 318 weights the original matching score with the sum of the confidence levels of each keywords in the candidate as appeared in the search item. The search items are sorted from highest weighted matching score to lowest weighted matching score and added to the reservoir. When there are no more of the candidates identified with high overall confidence levels left to process, all of the search items in the reservoir are sorted from highest weighted matching score to lowest weighted matching score. Search engine 306 then returns the list of identified search items 316 to caller device 302, where the search items 316 are ordered from highest to lowest weighted matching score.

Figure 4A:
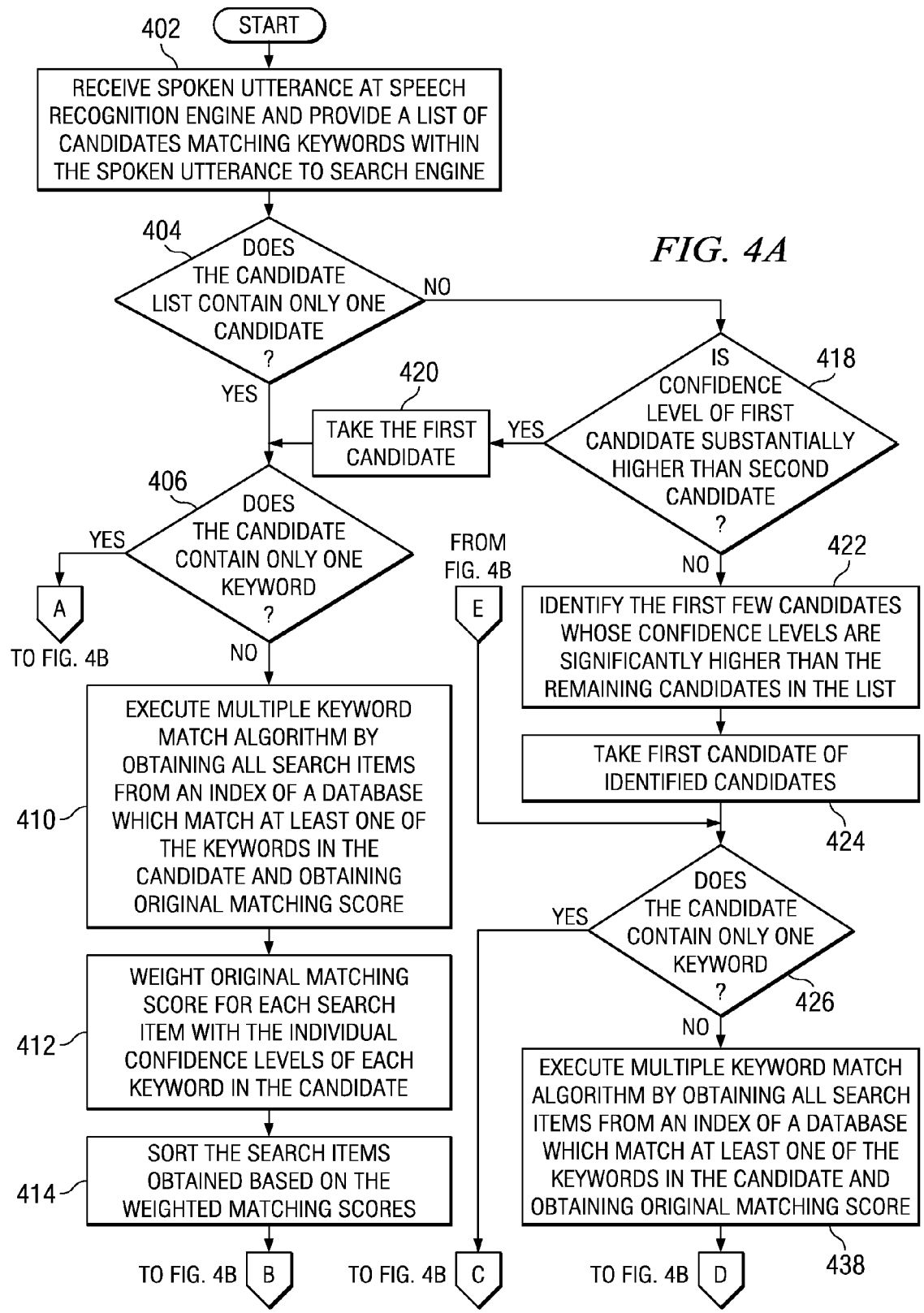
FIGS. 4A and 4B illustrate a flowchart describing a search algorithm for matching keywords spoken by a caller to keyword indexed search items in accordance with the illustrative embodiments.
Figure 4B:
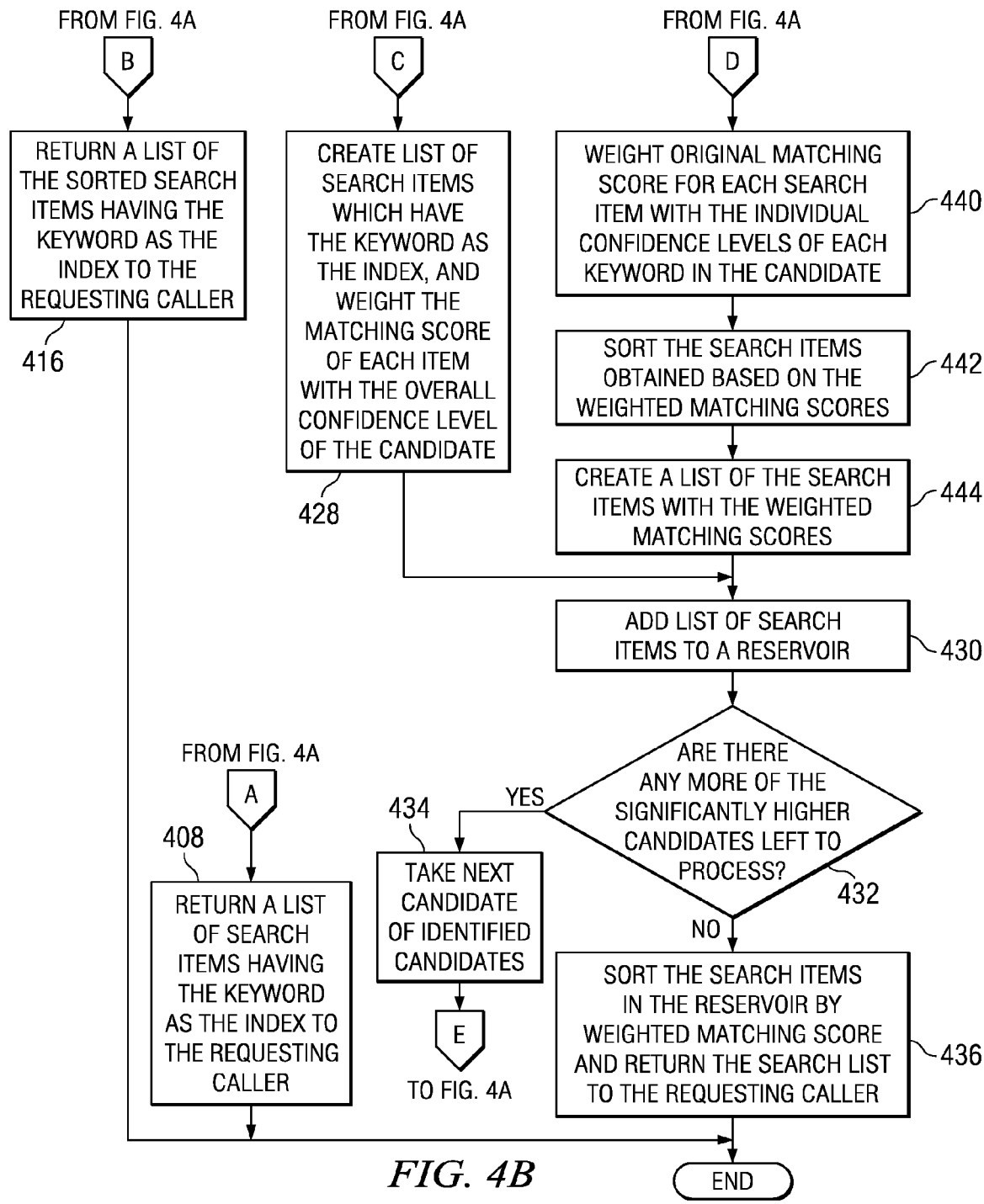

FIGS. 4A and 4B illustrate a flowchart describing a search algorithm for matching keywords spoken by a caller to keyword indexed search items in accordance with the illustrative embodiments. The keyword search process in FIGS. 4A and 4B is implemented when a search request in the form of a spoken utterance from a caller is received at the speech recognition engine 304 in FIG. 3. When the speech recognition engine receives the spoken utterance from a caller, the speech recognition engine identifies keywords within the spoken utterance and returns a list of candidates matching the identified keywords and the candidates' confidence levels to a search engine, such as search engine 306 in FIG. 3 (step 402). If the candidate list comprises multiple candidates, the candidates may be ranked in the candidate list based on the confidence level of each candidate. The candidates in the candidate list may be ranked from highest confidence level to lowest confidence level.

Once the list of candidates for keywords in the spoken utterance has been identified, the search engine employs a search algorithm which first makes a determination as to whether the candidate list contains only one candidate (step 404). If the candidate list contains only one candidate ('yes' output of step 404), the search algorithm determines if the candidate contains only one keyword (step 406). If the candidate contains only one keyword ('yes' output of step 406), the search engine returns a result list of search items which have the keyword as the index to the requesting caller (step 408), with the process terminating thereafter.

Turning back to step 406, if the candidate contains more than one keyword ('no' output of step 406), the search algorithm executes a multiple keyword match algorithm for the multiple keywords in the candidate. The multiple keyword match algorithm first obtains all search items from an index of a database which match at least one of the keywords in the candidate and obtains the original matching score for each search item (step 410). The multiple keyword match algorithm then weights the original matching score for each search item with the sum of the individual confidence levels of each keyword in the candidate (step 412). The multiple keyword match algorithm then sorts the search items obtained based on the weighted matching scores, such as from highest weighted matching score to lowest weighted matching score (step 414). The search engine then returns a result list of the sorted search items which have the keyword as the index to the requesting caller (step 416), with the process terminating thereafter.

As previously mentioned, if there are multiple candidates in the candidate list, the candidates may be sorted from highest confidence level to lowest confidence level. Turning back to step 404, if the candidate list contains more than one candidate ('no' output of step 404), the search algorithm determines whether the overall confidence level of the first candidate in the candidate list is substantially higher than the second candidate in the candidate list (step 418). If the overall confidence level of the first candidate is substantially higher than the second candidate ('yes' output of step 418), the search algorithm takes the first candidate (step 420) and continues to step 406 to process the first candidate.

Turning back to step 418, if the overall confidence level of the first candidate is not substantially higher than the second candidate ('no' output of step 418), the search algorithm identifies the first few candidates in the candidate list whose overall confidence levels are significantly higher than the remaining candidates in the candidate list (step 422). The search algorithm takes the first candidate of the identified candidates (step 424) and then determines if the candidate contains only one keyword (step 426). If the first candidate only contains one keyword ('yes' output of step 426), the search algorithm creates a list of search items which have the keyword as the index, and the original matching score of each of the search items is weighted by the overall confidence level of the candidate (step 428). The list of search items created is then added to a reservoir (step 430). The search algorithm determines if there are any more of the candidates identified as significantly higher than the remaining candidates in the candidate list left to process (step 432). If there are more identified candidates to process ('yes' output of step 432), the search algorithm takes the next candidate (step 434) and continues to step 426 to process the candidate. If there are no more identified candidates to process ('no' output of step 432), the search algorithm sorts the search items in the reservoir by weighted matching score from highest weighted matching score to lowest matching score, and returns the list to the caller (step 436), with the process terminating thereafter.

Turning back to step 426, if there is more than one keyword in the candidate ('no' output of step 426), the search algorithm executes the multiple keyword match algorithm for the multiple keywords in the candidate. The multiple keyword match algorithm first obtains all search items from an index of a database which match at least one of the keywords in the candidate (step 438). The multiple keyword match algorithm then weights the original matching score for each search item with the sum of the individual confidence levels of each keyword in the candidate (step 440). The multiple keyword match algorithm then sorts the search items obtained based on the weighted matching scores, such as from highest weighted matching score to lowest matching score (step 442). The search algorithm then creates a result list of the sorted search items with the weighted matching scores (step 444). The process then continues to step 430 where the list of search items is added to the reservoir.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for matching voice based keywords to keyword indexed search items, the computer implemented method comprising:
    responsive to receiving a spoken search request from a caller, identifying keywords within the spoken search request;
    creating a list of candidates comprising a match to at least one of the keywords, wherein each candidate in the list is assigned a level of confidence in the match;
    locating keyword indexed search items having at least one of the keywords as an index and an original matching score;
    weighting the original matching score of each keyword indexed search item with the level of confidence in the list of candidates to form weighted matching scores;
    sorting the keyword indexed search items based on the weighted matching scores; and
    creating a list of the sorted keyword indexed search items.

2. The computer implemented method of claim 1, further comprising:
    returning the list of the sorted keyword indexed search items to the caller.

3. The computer implemented method of claim 1, further comprising:
    responsive to creating the list of candidates, determining that at least one candidate in the list of candidates comprises a plurality of keywords; and
    assigning an individual level of confidence to each of the plurality of keywords.

4. The computer implemented method of claim 3, further comprising:
    if at least one candidate comprises a plurality of keywords, calculating weighted matching scores for each of the located keyword indexed search items, wherein the original matching score for each located keyword indexed search item is weighted by the sum of the individual levels of confidence assigned to each of the plurality of keywords.

5. The computer implemented method of claim 1, wherein if the level of confidence of one or more candidates in the list of candidates is substantially higher than the level of confidence of remaining candidates in the list of candidates, only the keyword indexed search items having a keyword as the index for the one or more candidates are located.

6. The computer implemented method of claim 1, wherein the identifying and creating steps are performed by a speech recognition engine.

7. The computer implemented method of claim 1, wherein the locating, weighting, sorting, and creating steps are performed by a search engine.

8. A data processing system for matching voice based keywords to keyword indexed search items, the data processing system comprising:
    a bus;
    a storage device connected to the bus, wherein the storage device contains computer usable code;
    at least one managed device connected to the bus;
    a communications unit connected to the bus; and
    a processing unit connected to the bus, wherein the processing unit executes the computer usable code to identify, in response to receiving a spoken search request from a caller, keywords within the spoken search request, create a list of candidates comprising a match to at least one of the keywords, wherein each candidate in the list is assigned a level of confidence in the match, locate keyword indexed search items having at least one of the keywords as an index and an original matching score, weight the original matching score of each keyword indexed search item with the level of confidence in the list of candidates to form weighted matching scores, sort the keyword indexed search items based on the weighted matching scores, and create a list of the sorted keyword indexed search items.

9. The data processing system of claim 8, wherein the processing unit further executes the computer usable code to return the list of the sorted keyword indexed search items to the caller.

10. The data processing system of claim 8, wherein the processing unit further executes the computer usable code to determine, in response to creating the list of candidates, that at least one candidate in the list of candidates comprises a plurality of keywords, and assigns an individual level of confidence to each of the plurality of keywords.

11. The data processing system of claim 10, wherein the processing unit further executes the computer usable code to calculate matching scores for each of the located keyword indexed search items if at least one candidate comprises a plurality of keywords, wherein the original matching score for each located keyword indexed search item is weighted by the sum of the individual levels of confidence assigned to each of the plurality of keywords.

12. The data processing system of claim 8, wherein if the level of confidence of one or more candidates in the list of candidates is substantially higher than the level of confidence of remaining candidates in the list of candidates, only the keyword indexed search items having a keyword as the index for the one or more candidates are located.

13. A computer program product for matching voice based keywords to keyword indexed search items, the computer program product comprising:
   a non-transitory computer readable medium storing computer usable program code tangibly embodied thereon, the computer usable program code comprising:
   computer usable program code for identifying, in response to receiving a spoken search request from a caller, keywords within the spoken search request;
   computer usable program code for creating a list of candidates comprising a match to at least one of the keywords, wherein each candidate in the list is assigned a level of confidence in the match;
   computer usable program code for locating keyword indexed search items having at least one of the keywords as an index and an original matching score;
   computer usable program code for weighting the original matching score of each keyword indexed search item with the level of confidence in the list of candidates to form weighted matching scores;
   computer usable program code for sorting the keyword indexed search items based on the weighted matching scores; and
   computer usable program code for creating a list of the sorted keyword indexed search items.

14. The computer program product of claim 13, further comprising:
   computer usable program code for returning the list of the sorted keyword indexed search items to the caller.

15. The computer program product of claim 13, further comprising:
   computer usable program code for determining, in response to creating the list of candidates, that at least one candidate in the list of candidates comprises a plurality of keywords; and
   computer usable program code for assigning an individual level of confidence to each of the plurality of keywords.

16. The computer program product of claim 15, further comprising:
   computer usable program code for calculating matching scores for each of the located keyword indexed search items if at least one candidate comprises a plurality of keywords, wherein the original matching score for each located keyword indexed search item is weighted by the sum of the individual levels of confidence assigned to each of the plurality of keywords.

17. The computer program product of claim 13, wherein if the level of confidence of one or more candidates in the list of candidates is substantially higher than the level of confidence of remaining candidates in the list of candidates, only the keyword indexed search items having a keyword as the index for the one or more candidates are located.

18. The computer program product of claim 13, wherein the computer usable program code for identifying keywords and creating a list of candidates is executed by a speech recognition engine.

19. The computer program product of claim 13, wherein the computer usable program code for locating keyword indexed search items, weighting the original matching score of each keyword indexed search item, sorting the keyword indexed search items, and creating the list of the sorted keyword indexed search items is executed by a search engine.

* * * * *